UNITED STATES PATENT OFFICE.

EUGEN ANDERWERT, HERMANN FRITZSCHE, AND HEINRICH SCHOBEL, OF BASEL, SWITZERLAND, ASSIGNORS TO SOCIETY OF CHEMICAL INDUSTRY IN BASLE, OF BASEL, SWITZERLAND.

SUBSTANTIVE ORTHOOXYAZO DYESTUFFS AND PROCESS OF MAKING SAME.

1,282,356.   Specification of Letters Patent.   Patented Oct. 22, 1918.

No Drawing. Original application filed October 7, 1915, Serial No. 54,513. Divided and this application filed April 26, 1917. Serial No. 164,795.

*To all whom it may concern:*

Be it known that we, EUGEN ANDERWERT, HERMANN FRITZSCHE, and HEINRICH SCHOBEL, all three chemists and citizens of the Swiss Republic, and residents of Basel, Switzerland, have invented new Substantive Orthooxyazo Dyestuffs and Processes of Making Same, of which the following is a full, clear, and exact specification.

This application is a divisional one of our application for Letters Patent Ser. No. 54513, filed October 7, 1915.

We have found that valuable new substantive polyazodyestuffs are obtained by combining 1 mol. of an aromatic tetrazo-compound with 1 mol. of an orthooxyazo-dyestuff able to combine with a further diazogroup and with 1 mol. of a further azo-dyestuff component, which can also be an orthooxymonoazodyestuff able to combine with a further diazogroup. As the aromatic tetrazo-compound there can be employed the tetrazo-compound derived from benzidin, tolidin, dianisidin, diaminostilbenedisulfonic acid, diaminodiphenylether, diaminodiphenylamin, aminobenzoyl-m-phenylenediamin, azooxyanilin, azooxytoluidin, diaminodiphenylurea, diaminodiphenylthiourea, etc.

The most valuable dyestuffs are obtained when the molecule of the dyestuff contains a 2:5:7-aminonaphtholsulfonic compound, as for instance the 2:5:7-aminonaphtholsulfonic acid

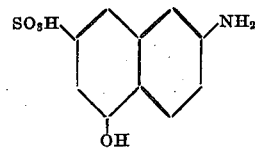

the 2:5:1:7-aminonaphtholdisulfonic acid

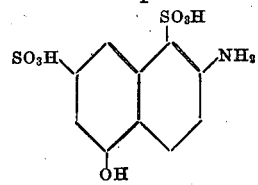

one of the following derivatives of 2:5:7-aminonaphtholsulfonic acid:

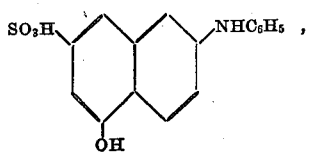

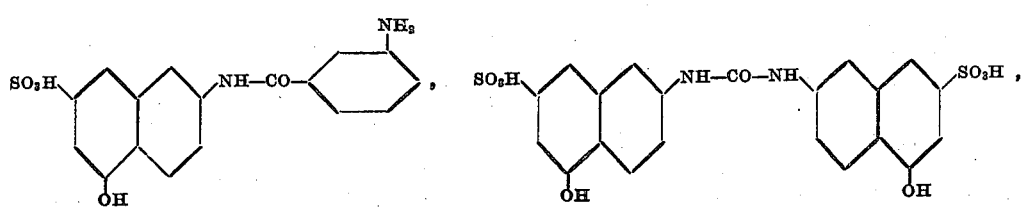

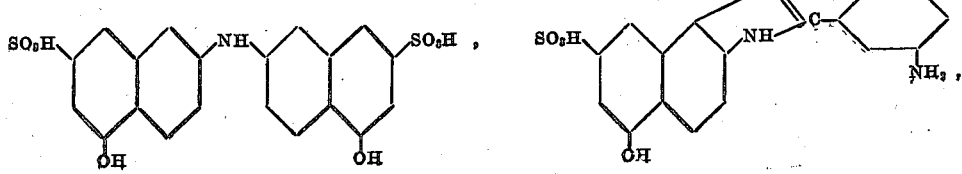

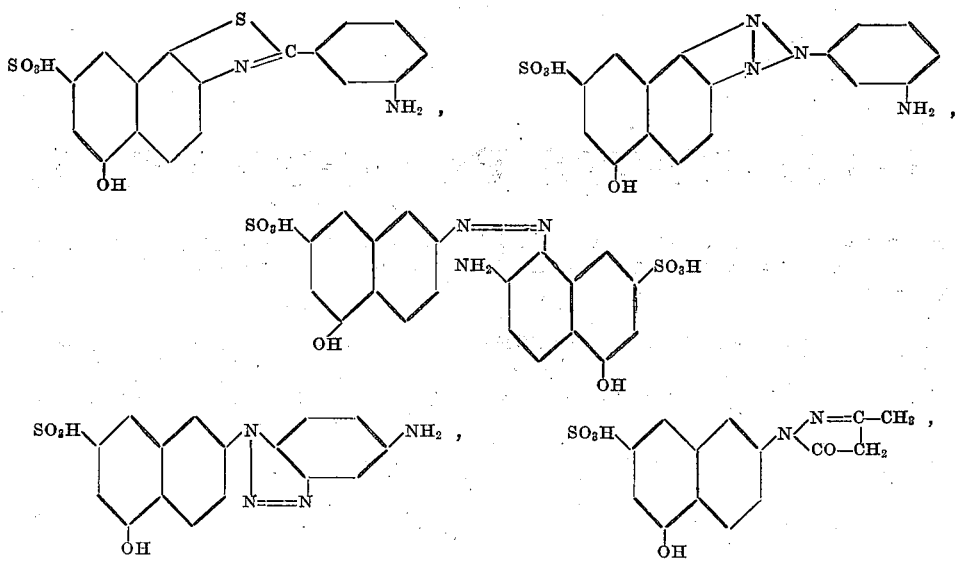

or one of the corresponding derivatives of 2:5:1:7-aminonaphtholdisulfonic acid.

As orthooxyazodyestuffs can be employed those resulting from the combination of the diazoderivatives of an orthoaminophenol compound or of an orthoaminonaphthol-compound with an azodyestuff component able to combine with two diazogroups appertaining to different diazo bodies as for instance one of the above specified 2:5:7-aminonaphtholsulfonic or 2:5:1:7-aminonaphtholdisulfonic compounds, the 1:8:4-aminonaphtholsulfonic acid, the 1:8:3:6-aminonaphtholdisulfonic acid, the 1:8:5-aminonaphtholsulfonic acid, the 1:8:4:6-aminonaphthol disulfonic acid, resorcinol, metaaminophenol, metaphenylenediamin, 2:-7-dioxynaphthalene, an aminonaphthol, etc.

The new dyestuffs are intensely colored powders yielding with concentrated sulfuric acid intensely colored solutions and dissolving in water with colorations which are changed intensely on addition of sodium carbonate or of soda lye and dyeing cotton, wool, silk, mixed goods, straw, wood and paper various tints, according to the methods used for the known substantive dyestuffs.

The invention is illustrated by the following examples:

Example 1: 10.9 kg. orthoaminophenol are diazotized and poured into a solution of 50.4 kg.

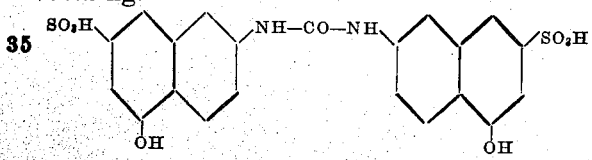

and 40 kg. sodium carbonate in water. The combination being achieved, a solution of the tetrazoderivative of 24.4 kg. dianisidin is poured into the mass. The intermediate product is formed after a short time whereafter a solution of 26 kg. 1:4-naptholsulfonic acid is added to the mass and the obtained trisazodyestuff isolated in the usual manner. It dyes unmordanted cotton dull blue tints.

Example 2: The monoazodyestuff resulting from the diazoderivative of 18.9 parts orthoaminophenolsulfonic acid and 11 parts resorcinol is added to a soda-alkaline solution of the intermediate product derived from the tetrazoderivative of 18.4 parts benzidin and 24 parts 2:5:7-aminonaphtholsulfonic acid. The combination being achieved the dyestuff is salted out, separated by filtration, pressed and dried. It dyes unmordanted cotton violet shades.

Instead of the diazophenolderivatives indicated in the examples, for the preparation of the monoazodyestuffs, there can be employed the corresponding diazoacidylphenol derivatives which are able to combine more easily, the acidylgroup being split off afterward by saponification.

The new dyestuffs are not only suitable for dyeing cotton, wool, silk and mixed goods, straw, wood, paper, leather, etc., like the known substantive dyestuffs, but also for the production of lakes and as parent materials for the production of valuable new derivatives.

What we claim is:

1. The described process for the manufacture of substantive polyazodyestuffs consisting in combining 1 molecule of an aromatic tetrazocompound with two molecules of azodyestuff components whereof at least one is a molecule of an orthooxyazodyestuff able to combine with a further diazogroup.

2. The described process for the manufacture of substantive polyazodyestuffs consisting in combining 1 molecule of an aromatic tetrazocompound with 2 molecules of azodyestuff components whereof at least one is a molecule of an orthooxyazodyestuff resulting from the combination of an orthooxydiazocompound with an aminonaphtholsulfonic compound.

3. The described process for the manufacture of substantive polyazodyestuffs consisting in combining 1 molecule of an aromatic tetrazocompound with 2 molecules of azodyestuff components, whereof at least one is a molecule of an orthooxyazodyestuff resulting from the combination of an orthooxydiazo-compound with a 2:5:7-aminonaphtholsulfonic compound.

4. The described process for the manufacture of substantive polyazodyestuffs consisting in combining 1 molecule of an aromatic tetrazocompound with 1 molecule of a 2:5:7-aminonaphtholsulfonic compound and with 1 molecule of an orthooxyazodyestuff able to combine with a further diazo-group.

5. The described process for the manufacture of substantive polyazodyestuffs consisting in combining 1 molecule of an aromatic tetrazocompound with 1 molecule of a 2:5:7-aminonaphtholsulfonic compound and with 1 molecule of an orthooxyazodyestuff derived from a 2:5:7-aminonaphtholsulfonic compound.

6. As new products the described substantive polyazodyestuffs derived from an aromatic tetrazocompound and from an orthooxyazodyestuff able to combine with a further diazogroup, which constitute deep colored powders yielding with concentrated sulfuric acid deep colored solutions and dissolving in water with colorations which are changed intensively on addition of sodium carbonate or of soda lye, and dye cotton, wool, silk, mixed goods, straw, wood and paper various tints according to the methods used for the known substantive dyestuffs.

7. As new products the described substantive polyazodyestuffs which derived from an aromatic tetrazocompound and from an orthooxyazodyestuff derived from an orthooxydiazocompound and an aminonaphtholsulfonic compound, constitute deep colored powders yielding with concentrated sulfuric acid deep colored solutions and dissolving in water with colorations which are changed intensively on addition of sodium carbonate or of soda lye, and dye cotton, wool, silk, mixed goods, straw, wood and paper various tints according to the methods used for the known substantive dyestuffs.

8. As new products the described substantive polyazodyestuffs which derived from an aromatic tetrazocompound and an orthooxyazodyestuff derived from an orthooxydiazocompound and a 2:5:7-aminonaphtholsulfonic compound, constitute deep colored powders yielding with concentrated sulfuric acid deep colored solutions and dissolving in water with colorations which are changed intensively on addition of sodium carbonate or of soda lye, and dye cotton, wool, silk, mixed goods, straw, wood and paper various tints according to the methods used for the known substantive dyestuffs.

9. As new products the described substantive polyazodyestuffs, which derived from an aromatic tetrazocompound, a 2:5:7-aminonaphtholsulfonic compound and an orthooxyazodyestuff able to combine with a further diazo-group, constitute deep colored powders yielding with concentrated sulfuric acid deep colored solutions and dissolving in water with colorations which are changed intensively on addition of sodium carbonate or of soda lye, and dye cotton, wool, silk, mixed goods, straw, wood and paper various tints according to the methods used for the known substantive dyestuffs.

10. As new products the described substantive polyazodyestuffs which derived from an aromatic tetrazo-compound, a 2:5:7-aminonaphtholsulfonic compound and an orthooxyazodyestuff derived from an orthooxydiazocompound and a 2:5:7-aminonaphtholsulfonic acid, constitute deep colored powders yielding with concentrated sulfuric acid deep colored solutions and dissolving in water with colorations which are changed intensively on addition of sodium carbonate or of soda lye, and dye cotton, wool, silk, mixed goods, straw, wood and paper various tints according to the methods used for the known substantive dyestuffs.

In witness whereof we have hereunto signed our names this third day of April 1917, in the presence of two subscribing witnesses.

EUGEN ANDERWERT.
HERMANN FRITZSCHE.
HEINRICH SCHOBEL.

Witnesses:
CARL O. SPAINER,
ARMAND BRAUN.